(12) United States Patent
Tang et al.

(10) Patent No.: US 9,075,487 B2
(45) Date of Patent: Jul. 7, 2015

(54) TOUCH PANEL

(75) Inventors: Yu-Ying Tang, Tainan (TW); Yen-Heng Huang, New Taipei (TW); Ho-Chieh Tseng, Taichung (TW); Shih-Po Chou, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 112 days.

(21) Appl. No.: 13/610,899

(22) Filed: Sep. 12, 2012

(65) Prior Publication Data

US 2013/0301192 A1 Nov. 14, 2013

(30) Foreign Application Priority Data

May 9, 2012 (TW) .............................. 101116569 A

(51) Int. Cl.
H05K 7/02 (2006.01)
G06F 3/044 (2006.01)
(52) U.S. Cl.
CPC ...... *G06F 3/044* (2013.01); *G06F 2203/04103* (2013.01); *G06F 2203/04107* (2013.01); *G06F 2203/04111* (2013.01)
(58) Field of Classification Search
CPC .......... G06F 3/044; G06F 2203/04103; G06F 2203/04107; G06F 2203/04111
USPC ....................................................... 361/760
See application file for complete search history.

(56) References Cited

U.S. PATENT DOCUMENTS

| 2011/0069036 A1* | 3/2011 | Anno ............................. 345/174 |
| 2011/0156930 A1* | 6/2011 | Chen et al. ....................... 341/33 |
| 2011/0304572 A1 | 12/2011 | Wang et al. |
| 2012/0069500 A1* | 3/2012 | Tang et al. ................ 361/679.01 |
| 2012/0162143 A1* | 6/2012 | Kai et al. ....................... 345/177 |

FOREIGN PATENT DOCUMENTS

| CN | 202008648 | 10/2011 |
| CN | 202189343 | 4/2012 |
| TW | M408078 | 7/2011 |
| TW | M419168 | 12/2011 |
| TW | M419990 | 1/2012 |

(Continued)

OTHER PUBLICATIONS

"Office Action of Taiwan Counterpart Application", issued on Aug. 21, 2014, p. 1-p. 7.

(Continued)

*Primary Examiner* — Jenny L Wagner
*Assistant Examiner* — Michael P McFadden
(74) *Attorney, Agent, or Firm* — Jianq Chyun IP Office

(57) ABSTRACT

A touch panel includes a substrate, a touch sensing element, a plurality of transmission lines, a first frame structure, and a second frame structure is provided. The touch sensing element is disposed on the substrate to define an active region. The transmission lines are connected to the touch sensing element. The first frame structure is disposed on the substrate and surrounding the active region to define a first periphery region. The transmission lines are at least partially located on a top surface of the first frame structure. The second frame structure is disposed on the substrate and surrounding the first frame structure, wherein the second frame structure is disposed at an outer border of the first periphery region. A material of the first frame structure is different from a material of the second frame structure.

20 Claims, 7 Drawing Sheets

(56) References Cited

FOREIGN PATENT DOCUMENTS

| TW | M420766 | 1/2012 |
| TW | M420767 | 1/2012 |
| TW | M420773 | 1/2012 |
| TW | 201205149 | 2/2012 |

OTHER PUBLICATIONS

"Office Action of China Counterpart Application", issued on Aug. 26, 2014, p. 1-p. 8.

* cited by examiner

TOUCH PANEL

CROSS-REFERENCE TO RELATED APPLICATION

This application claims the priority benefit of Taiwan application serial no. 101116569, filed on May 9, 2012. The entirety of the above-mentioned patent application is hereby incorporated by reference herein and made a part of this specification.

BACKGROUND

1. Field of the Invention

The invention relates to a touch panel, and more particularly, to a touch panel with flexible frame design.

2. Description of Related Art

A touch display device is constituted of both a display panel and a touch panel stacked on the display panel. In order to transmit a signal of the touch panel, a plurality of transmission lines is distributed at a periphery region of the touch panel, and same for the display panel. Therefore, the periphery region of a known display panel is usually designed with a shielding frame structure to shield the transmission lines. Consequently, the frame structure, in addition to providing a shielding effect, may further define a region for display function and touch operation on the touch display device to facilitate the use of a user. Because the user may directly see the frame structure, the design of the frame structure must be flexible in order to comply with the product specification.

SUMMARY OF THE INVENTION

The invention provides a touch panel having a frame structure with desirable design flexibility.

The invention provides a touch panel including a substrate, a touch sensing element, a plurality of transmission lines, a first frame structure, and a second frame structure. The touch sensing element is disposed on the substrate to define an active region. The plurality of transmission lines is connected to the touch sensing element. The first frame structure is disposed on the substrate and surrounds the active region to define a first periphery region, and the transmission lines are at least partially located on a top surface of the first frame structure. The second frame structure is disposed on the substrate and surrounding an outer border of the first frame structure, and a material of the first frame structure is different from a material of the second frame structure.

In an embodiment, a thickness of the second frame structure is greater than a thickness of the first frame structure.

In an embodiment, the second frame structure overlaps the first frame structure.

In an embodiment, the second frame structure completely covers the top surface of the first frame structure, and the transmission lines are located between the first frame structure and the second frame structure.

In an embodiment, the first frame structure is substantially black, and the second frame structure is substantially colorful.

In an embodiment, the material of the first frame structure substantially includes a photoresist material and the first frame structure is manufactured through a photolithography process.

In an embodiment, the material of the second frame structure substantially includes an ink material and the second frame structure is manufactured through a printing process.

In an embodiment, a thickness of the first frame structure is substantially no more than 2 microns.

In an embodiment, the touch sensing element includes a plurality of first sensing series each extending along a first direction and a plurality of second sensing series each extending along a second direction, wherein the first direction intersects with the second direction, and the transmission lines respectively connect the corresponding first sensing series and the corresponding second sensing series to a chip connection region at least located in the first periphery region.

In an embodiment, a material of the transmission lines includes metal.

In an embodiment, the touch panel further includes a protective layer disposed on the substrate, and the touch sensing element is located between the protective layer and the substrate.

In an embodiment, the substrate is a cover glass covering on a display panel.

In an embodiment, the first frame structure and the second frame structure are substantially non-conductive.

In an embodiment, the second frame structure defines a second periphery region at the outer border of the first periphery region away from the active region.

Based on the above, in at least one embodiment, two different materials are used to manufacture the first frame structure and the second frame structure in order to define two periphery regions surrounding the active region of the touch panel, and the transmission lines are disposed on the first frame structure. Accordingly, the material and the manufacture method of the second frame structure are not limited by a manufacture of the transmission lines and may have great design flexibility. Therefore, at least one embodiment of the touch panel may have a colorful frame or a dual-color frame; or at least one embodiment of the touch panel, following different design requirements, may even have a specific pattern or trademark on the frame.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
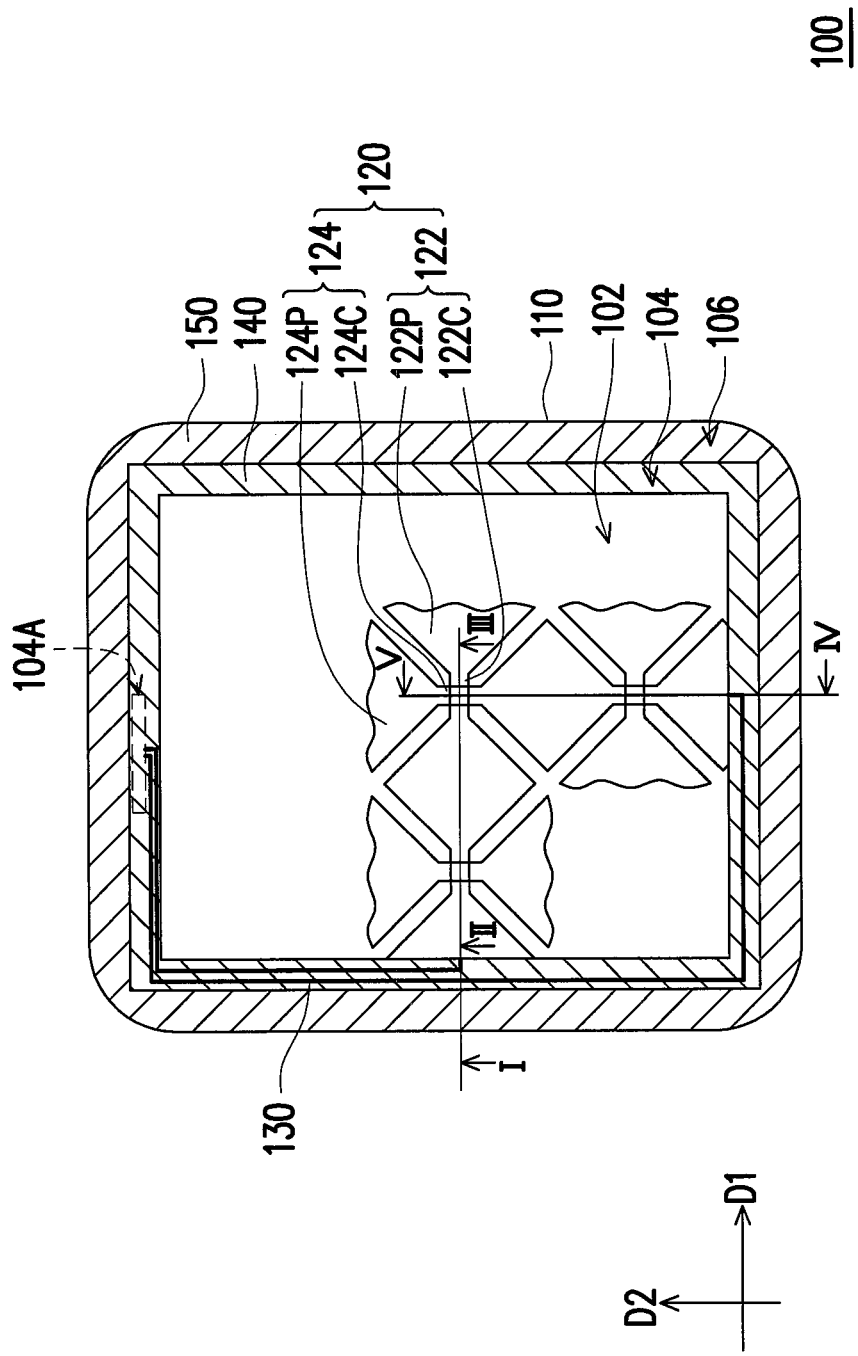
FIG. 1 illustrates a schematic diagram of a touch panel in accordance with an embodiment of the invention.

FIG. 1 illustrates a schematic diagram of a touch panel in accordance with an embodiment of the invention. Referring to FIG. 1, the touch panel 100, for instance, may be divided into an active region 102, a first periphery region 104 and a second periphery region 106, wherein the active region 102 is surrounded by the first periphery region 104 and the first periphery region 104 is surrounded by the second periphery region 106. Namely, the first periphery region 104 of the present embodiment is a region between the active region 102 and the second periphery region 106.

Specifically, the touch panel 100 includes a substrate 110, a touch sensing element 120, a plurality of transmission lines 130, a first frame structure 140, and a second frame structure 150, wherein the touch sensing element 120, the transmission lines 130, the first frame structure 140, and the second frame structure 150 are all disposed on the substrate 110. Noteworthily, FIG. 1 only schematically shows the disposed locations of the above components on the substrate 110 instead of directly showing the stacking relationships between each of the components.

The touch sensing element 120 includes a plurality of first sensing series 122 and a plurality of second sensing series 124, wherein the first sensing series 122 each extends along a first direction D1 and the second sensing series 124 each extends along a second direction D2, and the first direction D1 intersects with the second direction D2. The series, herein, are substantially a structure design of connecting a plurality of sensing conductive patterns in series. For example, each of the first sensing series 122 is constituted by connecting a plurality of first sensor parts 122P in series through a plurality of first bridges 122C, and each of the second sensing series 124 is constituted by connecting a plurality of second sensor parts 124P in series through a plurality of second bridges 124C. Although the first sensor parts 122P and the second sensor parts 124P in FIG. 1 are illustrated as the diamond-shaped conductive patterns, they may be designed as other shapes in other embodiments. Moreover, even though the present embodiment has been illustrated with the sensing element 120 having a series design, the invention is not limited thereto.

The touch sensing element 120 of the touch panel 100 needs to be driven in order to perform a sensing function, and a signal detected by the touch sensing element 120 have to be read out so that a corresponding command in accordance with a sensing result may be outputted and performed. Hence, the touch sensing element 120 must be connected to a driver/reading circuit or chip through the transmission lines 130. Generally, a region of the touch panel 100, reserved to be connected with the driver/reading circuit or chip, is defined as a chip connection region 104A. Therefore, in the present embodiment, an end of each transmission line 130 is connected to the corresponding sensing series while another end is extended to and located within the chip connection region 104A which is at least located in the first periphery region 104. Furthermore, in order to provide a desirable signal transmission quality, the transmission lines 130 are often manufactured with a metallic material, but are not limited thereto. In other words, in other embodiments, the transmission lines 130 may selectively be manufactured with a conductive material other than metal (e.g., metal oxide).

In order to shield the transmission lines 130, the first frame structure 140 is disposed in the first periphery region 104, where the transmission lines 130 are located. In other words, although transmission lines 130 and the first frame structure 140 are illustrated in FIG. 1, the first frame structure 140 is substantially shading the transmission lines 130 when a user is using the touch panel 100, so as to prevent the user from noticing the presence of the transmission lines 130.

Furthermore, in the present embodiment, a second frame structure 150 is disposed between the first frame structure 140 and a margin of the substrate 110. Hence, the frame of the touch panel 100 may at least be constituted of the first frame structure 140 and the second frame structure 150, thus enabling the frame design of the touch panel 100 to be more flexible. For example, when the first frame structure 140 and the second frame structure 150 present different colors or present different color saturations, the frame of the touch panel 100 is then not limited to a single color frame. Certainly, in several embodiments, the first frame structure 140 and the second frame structure 150 may selectively have a same color, thus presenting a single color visual effect. In overall, the dispositions of the first frame structure 140 and second frame structure 150 enable an appearance design of the touch panel 100 to be more flexible.

Figure 2:
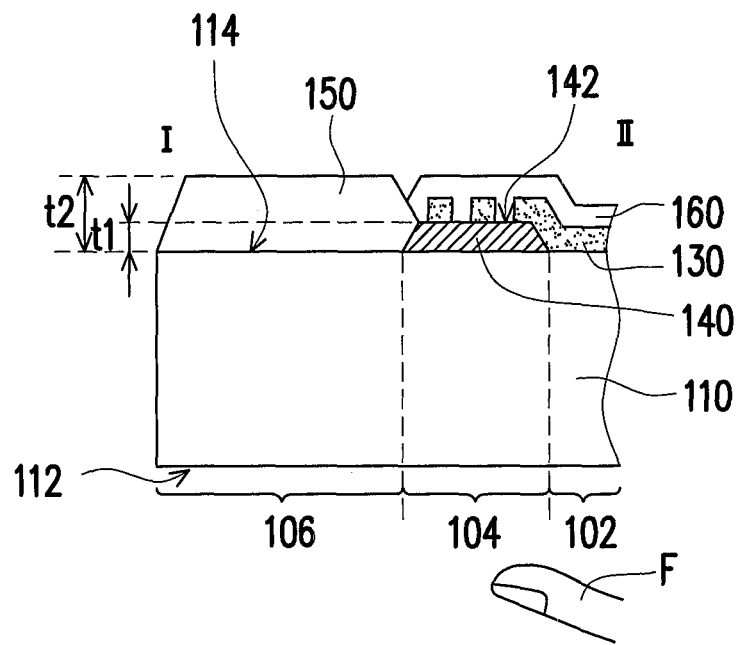
FIG. 2 illustrates a schematic partial cross-sectional view of the touch panel in FIG. 1 along a line I-II in accordance with an embodiment of the invention.

In detail, FIG. 2 illustrates a schematic partial cross-sectional view of the touch panel in FIG. 1 along a line I-II in accordance with an embodiment of the invention. Referring to FIG. 1 and FIG. 2, the touch panel 100, in addition to the components illustrated in FIG. 1, substantially includes a protective layer 160 covering the transmission lines 130 and the touch sensing element 120. Furthermore, as shown in FIG. 2, the first frame structure 140 is disposed on the substrate 110, and the transmission lines 130 are at least partially disposed on a top surface 142 of the first frame structure 140 away from the substrate 110. The second frame structure 150 is located a side of the first frame structure 140 away from the active region 102, and may even partially overlap the top surface 142 of the first frame structure 140. Since the transmission lines 130 are disposed on the first frame structure 140, the first frame structure 140 is a non-conductive structure, and the second frame structure 150 may also selectively be a non-conductive structure.

When the user uses the touch panel 100, the user and the components, including the first frame structure 140 etc., are respectively located at two opposite sides of the substrate 110. In other words, a finger F of the user when using the touch panel 100 is in contact with a first side 112 of the substrate 110, while the touch sensing element 120, the transmission lines 130, the first frame structure 140, the second frame structure 150, and the other components are disposed at a second side 114 of the substrate 110, wherein the first side 112 and the second side 114 are opposite to each other. When the first frame structure 140 provides sufficient shielding effect, the user may see the first frame structure 140 but not the transmission lines 130 nor a part of the second frame structure 150 that overlaps the first frame structure 140. Therefore, an area of the first frame structure 140 seen by the user is able to define the first periphery region 104. Furthermore, a part of the second frame structure 150 that does not overlap the first frame structure 140 is then seen by the user, and is able to define the second periphery region 106. In other words, the first frame structure 140 is a design for covering and shielding the transmission lines 130, and the area of the first frame structure 140 on the substrate 110 substantially may be approximately equal to a layout area required by the transmission lines 130. By reducing the layout area required by the transmission lines 130, the area of the first frame structure 140 may also be reduced.

In the present embodiment, the first frame structure 140 is, for example, manufactured with a photoresist material through a photolithography process. In order to have an ideal shielding property, the photoresist material may generally be black or white, so that the first frame structure 140 is able to provide a black or white frame design. Moreover, since the first frame structure 140 is manufactured with the photoresist material through the photolithography process, a thickness t1 of the first frame structure 140 may be no more than 2 microns to achieve the sufficient shielding property. Consequently, a disconnection problem due to poor step coverage is less prone to occur when the transmission lines 130 are extending from the top of substrate 110 to the top surface 142 of the first frame structure 140. In other words, the first frame structure 140, due to the material property and the manufacture method thereof, may have the suitable thickness and the required shielding property. Therefore, by using this first frame structure 140, the transmission quality of the touch panel 100 is good, and the first frame structure 140 may effectively shield the transmission lines 130, so as to comply with the product appearance demands of the user.

Furthermore, in the present embodiment, a material of the second frame structure 150 is, for example, an ink material and the second frame structure 150 can be manufactured through a printing (e.g., screen printing) process. The ink material may have a color following a selection of dyes. In addition, a specific pattern or trademark may be easily formed by forming the ink material on the substrate 110 through the printing process. Therefore, the second frame structure 150 may provide a verity of visual effects, and thus the frame design of the touch panel 100 is flexible. Noteworthily, when a required pattern design different from the original pattern design is needed, only a screen pattern used in the printing process has to be changed in order to manufacture the second frame structure 150 with the required pattern design. If the specific pattern is formed through performing the photolithography process, a photomask used in the photolithography process has to be changed. Comparatively, a new photomask using in the photolithography process requires higher cost than a new screen using in the printing process. Therefore, in the present embodiment, the second frame structure 150 is manufactured by using the printing process, which may reduce the manufacturing cost in addition to provide the touch panel 100 with a desirable flexible design by easily forming the required pattern.

Generally, in order to achieve a sufficient shielding effect or a desirable color saturation, the second frame structure 150 formed through the printing process may be required to have a thickness t2 greater than 2 microns. Under the design of disposing the transmission lines 130 on the second frame structure 150, the disconnection problem is prone to occur owing to poor step coverage phenomenon. Therefore, the present embodiment by disposing the transmission lines 130 on the first frame structure 140 of a smaller thickness t1 is conducive to enhance a manufacturing yield of the transmission lines 130 under a premise of effectively shielding the transmission lines 130. Then, the thickness t2 of the second frame structure 140 is not required to be particularly limited, namely, the value of the thickness t2 may be different from the thickness t1 but still may selectively equal to the thickness t1. Since the second frame structure 140 may have a specific color and the pattern formed in the second frame structure 140 is easily made, contributively enhancing the design flexibility of the touch panel 100. The touch panel 100, in addition to have an ideal quality, may further comply with the product appearance demands of the user.

Figure 3:
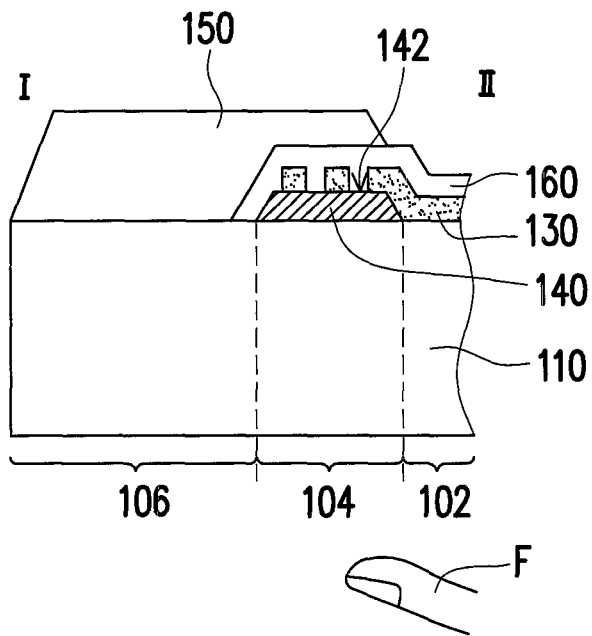
FIG. 3 illustrates a schematic partial cross-sectional view of the touch panel in FIG. 1 along a line I-II in accordance with another embodiment of the invention.

Moreover, FIG. 3 schematically illustrates a partial cross-sectional view of the touch panel in FIG. 1 along a line I-II in accordance with another embodiment of the invention. Referring to FIG. 2 and FIG. 3, the present implementation is similar to FIG. 2, but the second frame structure 150 in the present implementation completely covers the top surface 142 of the first frame structure 140, and the transmission lines 130 are located between the first frame structure 140 and the second frame structure 150. As shown in FIG. 2 and FIG. 3, the size of an overlapping area of the first frame structure 140 and the second frame structure 150 is not particularly limited. The second frame structure 150 may partially overlap the top surface 142 of the first frame structure 140 or completely cover on the top surface 142 of the first frame structure 140.

In addition, in the touch panel 100, a cross-sectional structure design of the touch sensing element 120 may have a plurality of implementations, and the following are several exemplary implementations provided for description. However, the invention is not limited to the following implementations. Furthermore, in the following implementations, all the second frame structures 150 are being described using the design illustrated in FIG. 2, but the design in FIG. 3 may also be applied to the following implementations, or the designs in FIG. 2 and FIG. 3 may both be applied to a same touch panel 100.

Figure 4A:
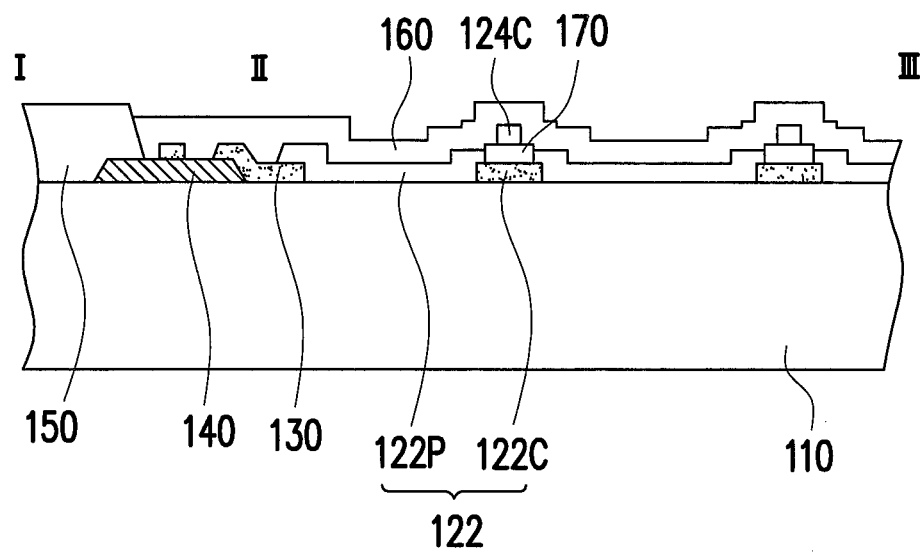
FIG. 4A and FIG. 4B schematically illustrate two partial cross-sectional views of the touch panel in FIG. 1 along a line and along a line IV-V in accordance with a first embodiment of the invention.
Figure 4B:
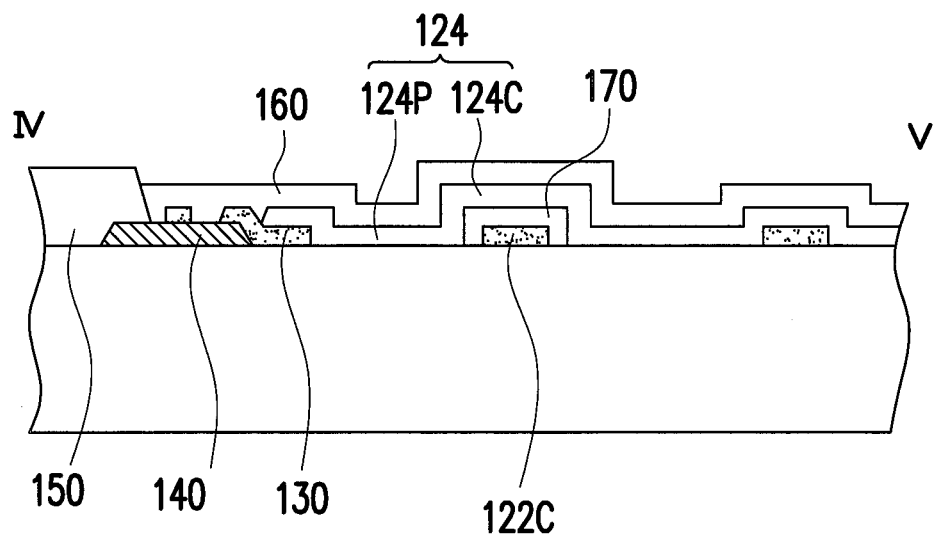

FIG. 4A and FIG. 4B illustrate two partial cross-sectional views of the touch panel in FIG. 1 along a line and along a line IV-V in accordance with a first embodiment. Referring to FIG. 1, FIG. 4A and FIG. 4B, in the touch panel 100, since the entire touch sensing element 120 constituted of the first sensing series 122 and the second sensing series 124 is covered by the protective layer 160, and is located between the protective layer 160 and the substrate 110, the first sensor parts 122P of the first sensing series 122 and the second sensor parts 124P of the second sensing series 124 may all be disposed at a surface of the substrate 110, thus presenting a coplanar relationship. Moreover, in order to prevent electrical short-circuit between the first sensing series 122 and second sensing series 124, an island insulating pattern 170 is disposed between each first bridge 122C and the corresponding second bridge 124C.

As for the material, the entire second sensing series 124 and the first sensor parts 122P of the first sensing series 122, herein, are all manufactured with a same material, such as, a transparent conductive material (including indium tin oxide, indium zinc oxide, and other metal oxide). The first bridges 122C of the first sensing series 122 may be manufactured with the abovementioned transparent conductive material or another conductive material. In the first embodiment, the first bridges 122C of the first sensing series 122 are, for example, manufactured with the same material as the transmission lines 130.

As for the manufacturing process, after forming the first frame structure 140 on the substrate 110, the transmission lines 130 manufactured with a good conductive metal material may be formed. The material of the first bridges 122C and the material of the transmission lines 130 are the same, and thus the first bridges 122C and the transmission lines 130 may be concurrently manufactured. Next, the island insulating pattern 170 is manufactured on the first bridges 122C, and subsequently, the first sensor parts 122P and the second sensing series 124 are formed on the substrate 110 using the transparent conductive material. Subsequently, the second frame structure 150 is manufactured on the substrate 110 by using the printing process. Since the printing process may be performed after the manufacturing of the touch sensing element 120 and the transmission lines 130, the ink material for constituting the second frame structure 150 is not susceptible to be influenced by a manufacturing process of touch sensing element 120 (e.g., the photolithography process) to deteriorate. Namely, the effect (color) presented by the second frame structure 150 is able to comply with the intended design, and is not changed due to the influence of the manufacturing process of the other components.

However, the manufacturing process of the touch sensing element 120 is not particularly limited, and the touch sensing element 120 may be completed by forming the island insulating pattern 170 on the first bridges 122C before manufacturing the second sensing series 124. For example, the first sensor parts 122P and the second sensing series 124, even though are manufactured with the same material, may be manufactured with different steps. Therefore, the first bridges 122C may be selectively manufactured in concurrent with the first sensor parts 122P, and then have the same material with the first sensor parts 122P.

Figure 5A:
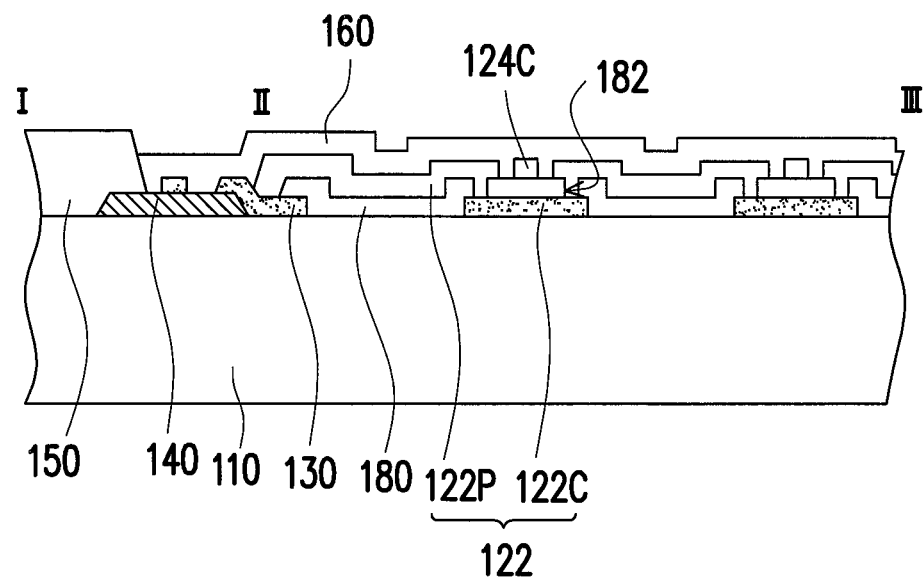
FIG. 5A and FIG. 5B schematically illustrate two partial cross-sectional views of the touch panel in FIG. 1 along a line and along a line IV-V in accordance with a second embodiment of the invention.
Figure 5B:
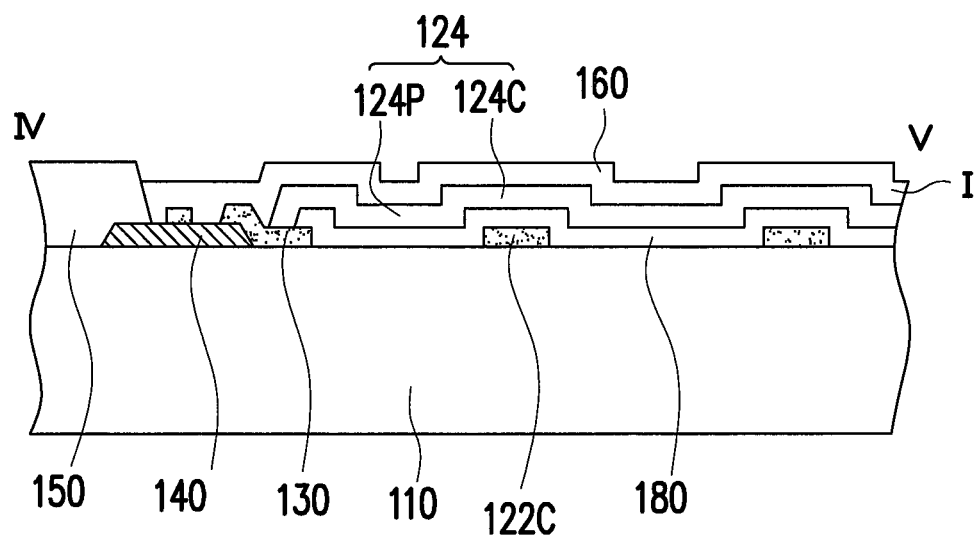

FIG. 5A and FIG. 5B illustrate two partial cross-sectional views of the touch panel in FIG. 1 along a line and along a line IV-V in accordance with a second embodiment. Referring to FIG. 1, FIG. 5A and FIG. 5B, the design of the present embodiment is similar FIG. 4A and FIG. 4B. However, in the present embodiment, an insulating layer 180 is disposed between the first bridges 122C of the first sensing series 122 and the second bridges 124C of the second sensing series 124, and the insulating layer 180 has a plurality of contact windows 182 for exposing the both ends of each first bridge 122C. Namely, the present embodiment substitutes the island insulating pattern 170 of the previous embodiment with the insulating layer 180. Furthermore, the first sensor parts 122P and the second sensing series 124 are all disposed at a top surface of the insulating layer 180 away from the substrate 100, wherein as shown in FIG. 5A, the first sensor parts 122P are connected to the first bridges 122C through the contact windows 182.

Figure 6A:
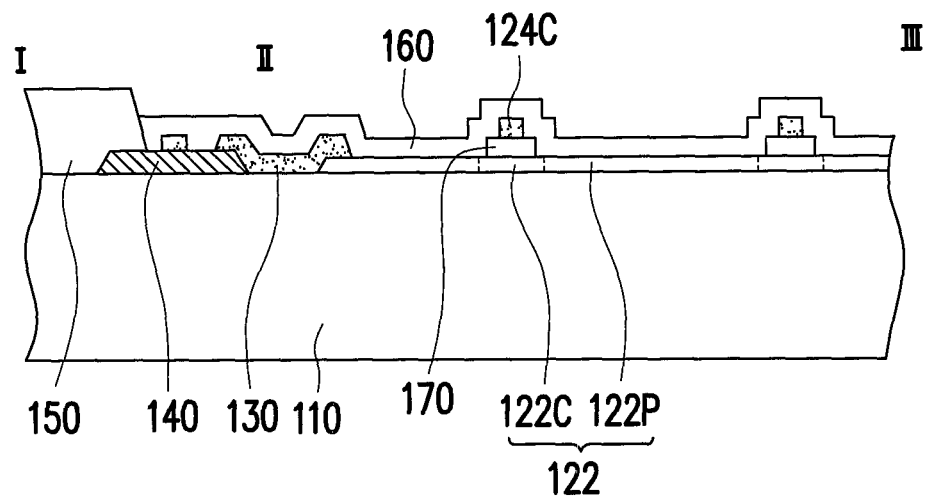
FIG. 6A and FIG. 6B schematically illustrate two partial cross-sectional views of the touch panel in FIG. 1 along a line and along a line IV-V in accordance with a third embodiment of the invention.
Figure 6B:
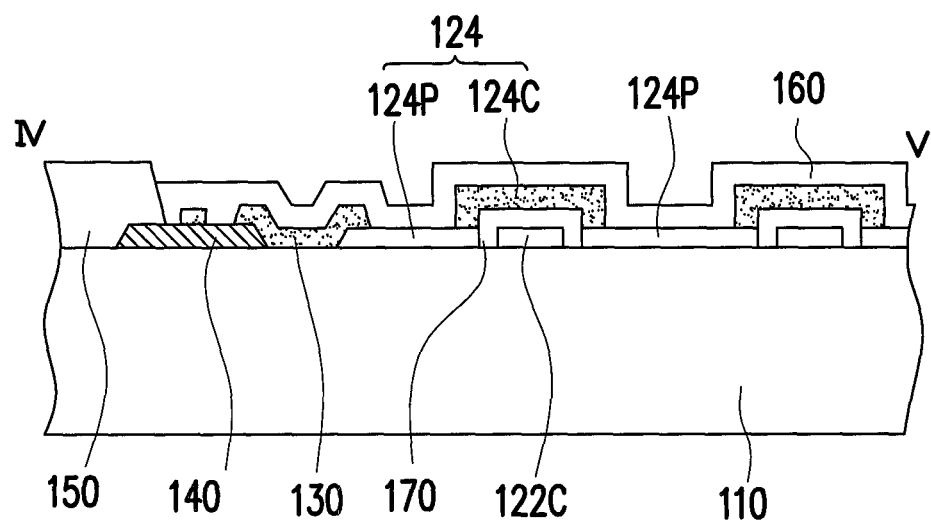

FIG. 6A and FIG. 6B illustrate two partial cross-sectional views of the touch panel in FIG. 1 along a line and along a line IV-V in accordance with a third embodiment. Referring to FIG. 1, FIG. 6A and FIG. 6B, in the present embodiment, the first bridge 122C is separated from the second bridge 124C by the island insulating pattern 170. Moreover, due to a change in processing sequence, the transmission lines 130 are, for example, partially extended at the top surfaces of the first sensor parts 122P away form the substrate 110.

Herein, the first sensing series 122 are, for example, entirely manufactured on the surface of the substrate 110 with the same material (transparent conductive material), and the second sensor parts 124P may also be manufactured with the transparent conductive material. In addition, the second bridges 124C may choose to be manufactured with the metal material or to be manufactured with the same material used for the second sensor parts 124P. When the second bridges 124C are manufactured with the metal material, the second bridges 124C and the transmission lines 130 may be concurrently manufactured. When the material of second bridges 124C and the material of the second sensor parts 124P are the same, the second bridges 124C and the second sensor parts 124P may be concurrently manufactured in a same step.

Figure 7A:
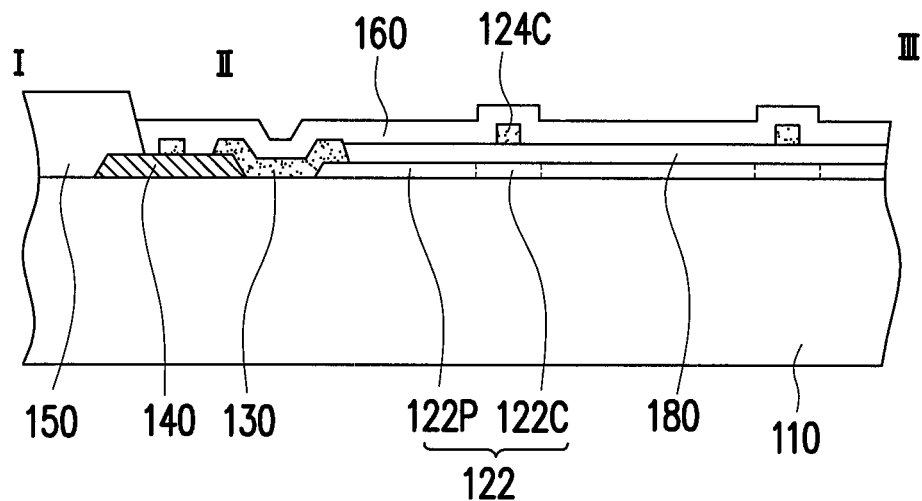
FIG. 7A and FIG. 7B schematically illustrate two partial cross-sectional views of the touch panel in FIG. 1 along a line and along a line IV-V in accordance with a fourth embodiment of the invention.
Figure 7B:
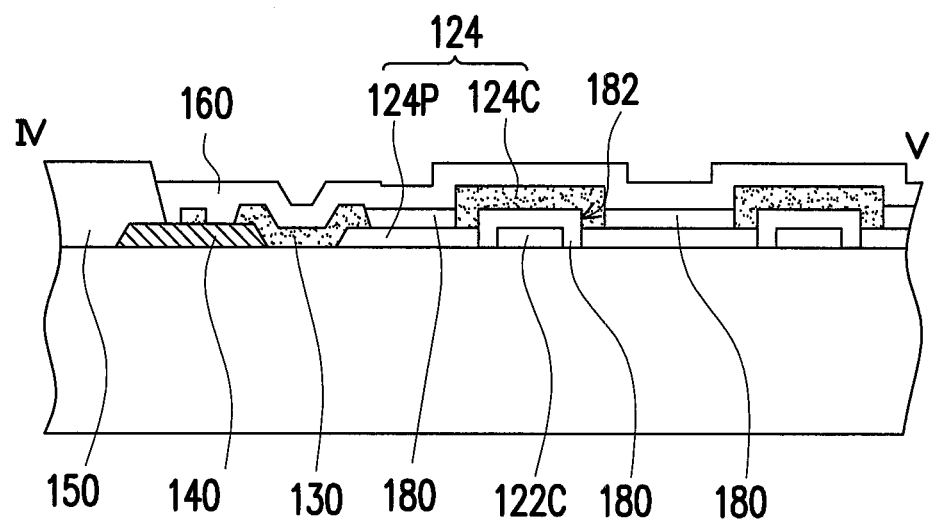

FIG. 7A and FIG. 7B illustrate two partial cross-sectional views of the touch panel in FIG. 1 along a line and along a line IV-V in accordance with a fourth embodiment. Referring to FIG. 1, FIG. 7A and FIG. 7B, the design of the present embodiment is similar to FIG. 6A and FIG. 6B. However, in the present embodiment, the insulating layer 180 is disposed between the first bridges 122C of the first sensing series 122 and the second bridges 124C of the second sensing series 124, and the insulating layer 180 has a plurality of contact windows 182 for exposing the both ends of the first bridge 122C. Namely, the present embodiment substitutes the island insulating pattern 170 of the previous embodiment with the insulating layer 180. Moreover, the second sensor parts 124P and the first sensing series 122 are all disposed between the insulating layer 180 and the substrate 110, wherein as shown in FIG. 7B, the second bridges 124C are connected to the second sensor parts 124P through the contact windows 182.

Figure 8:
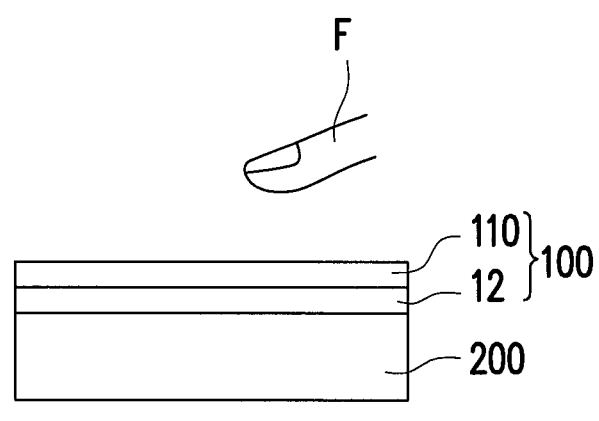
FIG. 8 illustrates a side-view schematic diagram of an electronic device in accordance with an embodiment of the invention.

FIG. 8 illustrates a side-view schematic diagram of an electronic device in accordance with an embodiment. Referring to FIG. 8, the electronic device 10 includes the touch panel 100 and a display panel 200, wherein the touch panel 100 is disposed in front of the display panel 200. The structure and the features of the touch panel 100 may substantially be referred to the aforementioned descriptions, and thus is not repeated herein. Noteworthily, according to the foregoing, the touch panel 100 is mainly constituted of the substrate 110 and the components disposed on the substrate 110, such as the touch sensing element 120, the transmission lines 130, the first frame structure 140, and the second frame structure 150. For simplifying the descriptions, the touch sensing element 120, the transmission lines 130, the first frame structure 140, and the second frame structure 150 are, herein, represented by a component 12. As shown in FIG. 8, the component 12 is disposed between the substrate 110 and the display panel 200. Then, the touch panel 100 is disposed in front of the display panel 200, so that the substrate 110 in the touch panel 100 may be the most exterior component of the electronic device 10, and thus is in directly with the finger F of the user. Therefore, the substrate 110 in the touch panel 100 may be a cover glass in order to provide ideal mechanical properties such as scratch resistant, wear resistant and so on. However, in other embodiments, the substrate 110 of the touch panel 100 may also choose to be constituted of a flexible substrate or other flat shaped objects with translucent nature.

In summary, in the invention, two frame structures of different materials are disposed on the touch panel at the periphery region. Hence, the periphery region may at least present two different visual effects, and then contributes to enhance the design flexibility of the touch panel appearance. In the two frame structures of different materials, at least one frame structure has an ideal shielding effect and a suitable thickness, and thus the transmission lines may be disposed thereon with desirable signal transmission quality. The other frame structure may be manufactured with a relatively simple and lower cost process, which is conducive to enable the manufacture and the design of the touch panel to be flexible.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, assembled with a display panel, the touch panel comprising:
   a substrate;
   a touch sensing element, disposed on the substrate to define an active region;
   a plurality of transmission lines, connected to the touch sensing element;
   a first frame structure, disposed on the substrate and surrounding the active region to define a first periphery region, and the transmission lines are at least partially located on a top surface of the first frame structure; and
   a second frame structure, disposed on the substrate and surrounding the first frame structure, wherein the second frame structure is disposed at an outer border of the first periphery region, the second frame structure at least partially covers the first frame structure, a material of the first frame structure is different from a material of the second frame structure, and the first frame structure and the second frame structure are disposed between the substrate and the display panel.

2. The touch panel as recited in claim 1, wherein a thickness of the second frame structure is greater than a thickness of the first frame structure.

3. The touch panel as recited in claim 1, wherein the second frame structure is in contact with the top surface of the first frame structure.

4. The touch panel as recited in claim 1, wherein the second frame structure completely covers the top surface of the first frame structure, and the transmission lines are located between the first frame structure and the second frame structure.

5. The touch panel as recited in claim 1, wherein the first frame structure is substantially black, and the second frame structure is substantially colorful.

6. The touch panel as recited in claim 1, wherein the material of the first frame structure substantially comprises a photoresist material and the first frame structure is manufactured through a photolithography process.

7. The touch panel as recited in claim 1, wherein the material of the second frame structure substantially comprises an ink material and the second frame structure is manufactured through a printing process.

8. The touch panel recited in claim 1, wherein a thickness of the first frame structure is substantially no more than 2 microns.

9. The touch panel as recited in claim 1, wherein the touch sensing element comprises a plurality of first sensing series each extending along a first direction and a plurality of second sensing series each extending along a second direction, wherein the first direction intersects with the second direction, and the transmission lines respectively connect the corresponding first sensing series and the corresponding the second sensing series to a chip connection region at least located in the first periphery region.

10. The touch panel recited in claim 1, wherein a material of the transmission lines comprises metal.

11. The touch panel as recited in claim 1 further comprising a protective layer disposed on the substrate, and the touch sensing element is located between the protective layer and the substrate.

12. The touch panel as recited in claim 1, wherein the substrate is a cover glass covering on the display panel.

13. The touch panel as recited in claim 1, wherein the first frame structure and the second frame structure are substantially non-conductive.

14. The touch panel as recited in claim 1, wherein the second frame structure defines a second periphery region at the outer border of the first periphery region away from the active region.

15. The touch panel as recited in claim 1, wherein the first frame structure is directly in contact with the substrate and at least part of the second frame structure is directly in contact with the substrate such that the first frame structure and the at least part of the second frame structure are on the same layer.

16. The touch panel as recited in claim 1, wherein the transmission lines are disposed between the first frame structure and the display panel.

17. The touch panel as recited in claim 16, wherein the material of the first frame structure substantially comprises a photoresist material and the material of the second frame structure substantially comprises an ink material.

18. The touch panel as recited in claim 11, wherein the second frame structure and the protective layer completely cover the top surface of the first frame structure.

19. The touch panel as recited in claim 9, wherein an insulating layer is disposed between the first sensing series and the second sensing series, and the first frame structure is separated from the insulating layer.

20. The touch panel as recited in claim 1, wherein the substrate includes a first side and a second side, the first frame structure and the second frame structure are disposed on the second side, and the first side is used for receiving a touch.

* * * * *